(12) United States Patent
Iwamura et al.

(10) Patent No.: US 8,548,489 B2
(45) Date of Patent: Oct. 1, 2013

(54) ACCESS GATEWAY DEVICE AND TRACKING AREA IDENTIFIER NOTIFICATION METHOD

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 494 days.

(21) Appl. No.: 12/446,006

(22) PCT Filed: Oct. 29, 2007

(86) PCT No.: PCT/JP2007/071061
§ 371 (c)(1),
(2), (4) Date: Apr. 17, 2009

(87) PCT Pub. No.: WO2008/053855
PCT Pub. Date: May 8, 2008

(65) Prior Publication Data
US 2010/0323705 A1    Dec. 23, 2010

(30) Foreign Application Priority Data

Oct. 31, 2006 (JP) .................................. 2006-297051

(51) Int. Cl.
*H04W 24/00* (2009.01)
(52) U.S. Cl.
USPC ........ 455/456.1; 455/436; 455/438; 455/439; 455/440; 455/422.1
(58) Field of Classification Search
USPC ............ 455/440, 436, 456.1, 438, 439, 422.1
See application file for complete search history.

(56) References Cited

U.S. PATENT DOCUMENTS

| | | | |
|---|---|---|---|
| 5,440,758 A * | 8/1995 | Grube et al. | 455/9 |
| 6,101,388 A | 8/2000 | Keshavachar | |
| 7,046,990 B2 * | 5/2006 | Grego et al. | 455/410 |
| 2002/0111180 A1* | 8/2002 | Hogan et al. | 455/518 |
| 2002/0123348 A1* | 9/2002 | Willars et al. | 455/436 |
| 2004/0157600 A1* | 8/2004 | Stumpert et al. | 455/432.1 |

(Continued)

FOREIGN PATENT DOCUMENTS

| | | |
|---|---|---|
| JP | 05-007180 A | 1/1993 |
| JP | 11-041649 A | 2/1999 |

OTHER PUBLICATIONS

International Search Report w/translation from PCT/JP2007/071061 dated Jan. 29, 2008 (4 pages).

(Continued)

*Primary Examiner* — Temica Beamer
(74) *Attorney, Agent, or Firm* — Osha Liang LLP

(57) ABSTRACT

An access gateway device is disclosed that is used in a mobile communication system and that is capable of storing an identifier of a tracking area in which a mobile station in communication is located. The access gateway device includes a table unit storing a table having a corresponding relationships between a tracking area and a base station managing a cell included in the tracking area; a tracking area identifier comparison unit referring to the table at a predetermined timing, detecting the identifier of the tracking area in which the mobile station is located, and comparing the detected identifier of the tracking area with the stored identifier; and a tracking area identifier notification unit notifying the mobile station of the detected identifier of the tracking area when the detected identifier of the tracking area is different from the stored identifier based on a result of the comparison.

7 Claims, 12 Drawing Sheets

(56) References Cited

U.S. PATENT DOCUMENTS

2006/0025160 A1 2/2006 Kodali et al.
2007/0275707 A1* 11/2007 Kwak et al. ............... 455/414.2
2008/0019335 A1* 1/2008 Wallace et al. ............... 370/338

OTHER PUBLICATIONS

Written Opinion from PCT/JP2007/071061 dated Jan. 29, 2008 (3 pages).
3rd Generation Partnership Project; Technical Specification Group Services and System Aspects; Rationale and track of security decisions in Long Term Evolved RAN/3GPP System Architecture Evolution (Release 7); 3GPP Document V0.0.2; 3GPP Organizational Partners, Apr. 2006; pp. 1-24 (24 pages).
Siemens; "Roaming/Area Restrictions for LTE"; 3GPP Joint TSG RAN WG2—WG3 Meeting #49; R2-052910; Seoul, Korea; Nov. 7-11, 2005; pp. 1-3 (3 pages).
Texas Instruments; "Random Access Usage for RRC State Transitions and Mobility Support"; 3GPP TSG RAN WG2 Meeting #52; R2-061071; Athens Greece; Mar. 27-31, 2006; pp. 1-4 (4 pages).
Lucent Technologies; "Signalling of UE Capability"; 3GPP TSG RAN WG2 #54; R2-062232; Tallinn, Estonia; Aug. 28-Sep. 1, 2006; pp. 1-3 (3 pages).
Ericsson; "Early User-Plane Transmission"; 3GPP TSG-RAN WG2 #54; Tdoc R2-062129; Tallinn, Estonia; Aug. 28-Sep. 1, 2006; pp. 1-4 (4 pages).
NTT DoCoMo, Inc.; "Initial Access Procedure in LTE"; 3GPP TSG-RAN WG2 #55; R2-062911; Seoul, Korea; Oct. 9-13, 2006 (4 pages).
"3rd Generation Partnership Project; Technical Specification Group Radio Access Network; Evolved Universal Terrestrial Radio Access (E-UTRA) and Evolved Universal Terrestrial Radio Access network (E-UTRAN); Radio interface protocol aspects (Release 7)"; 3GPP TR25.813, V1.0.1; Jun. 2006 (39 pages).
Japanese Office Action for Application No. 2006-297051, mailed on Sep. 13, 2011 (4 pages).
Patent Abstracts of Japan for Japanese Publication No. 11-041649, publication date Feb. 12, 1999 (1 page).
Patent Abstracts of Japan for Japanese Publication No. 05-007180, publication date Jan. 14, 1993 (1 page).
Office Action for European Application No. 07830795.6 dated May 10, 2013 (8 pages).
3GPP TS 23.060 V7.2.0; 3rd Generation Partnership Project; Technical Specification Group Services and System Aspects; General Packet Radio Service (GPRS); Service description; Stage 2; (Release 7) (Sep. 2006) (214 pages).

* cited by examiner

ACCESS GATEWAY DEVICE 300
- 302 PATH SWITCH SECTION
- 304 TRACKING AREA DETERMINATION SECTION
- 306 TRACKING AREA VS. BASE STATION CORRESPONDING TABLE

| IDENTIFIER OF TRACKING AREA | IDENTIFIER OF BASE STATION |
|---|---|
| #1 | 1 |
|  | 2 |
|  | 10 |
|  | 12 |
| #2 | 3 |
|  | 5 |
|  | 7 |
| #3 | 8 |
|  | 9 |
|  | 11 |

ACCESS GATEWAY DEVICE AND TRACKING AREA IDENTIFIER NOTIFICATION METHOD

TECHNICAL FIELD

The present invention generally relates to an LTE (Long Term Evolution) system, and more particularly to an access gateway device and a tracking area identifier notification method.

BACKGROUND ART

In a mobile communication network, the location of a mobile station is stored using the tracking area where the mobile station is located as a unit. The term tracking area corresponds to the term LA (Location Area) or the term RA (Routing Area) used in a 3G network and includes one or more cells.

In the mobile communication network, there may be provided an access gateway device that manages each mobile station and an HLR (Home Location Register) that stores the identifier of the access gateway apparatus.

Each mobile station has two operation modes, i.e., an active mode and an idle mode.

The mobile station in the idle mode, i.e., the mobile station in a state of waiting for a call, selects a cell having the best channel status (quality) and receives a paging channel (PCH) from the cell. Then, the mobile station checks the received paging channel (PCH) to determine whether a flag is set indicating that there is a call arrival to the mobile station. When it is determined that the flag is set, the mobile station accesses the cell (serving cell) via an uplink channel. Then, the mobile station establishes a connection with the serving cell and goes into the active mode. At this moment, the network (or network side) may identify the serving cell where the mobile station is located.

Therefore, when the mobile station is in the idle mode, no connection is established between the network side and the mobile station. Therefore, the network side is not able to identify the serving cell where the mobile station is located. Because of this situation, the network has to transmit the paging channel (PCH) to each cell belonging to the tracking area.

In each tracking area, each cell issues a notification of an identifier of the tracking area, so that the mobile station in the idle mode receives the notification of the identifier of the tracking area (tracking area identifier). By doing in this way, the mobile station can identify the tracking area to which the mobile station belongs.

For example, when the mobile station moves from a first cell into a second cell which is the cell adjacent to the first cell and the tracking area identifier notified to the mobile station when in the second cell is different from the tracking area identifier notified to the mobile station when in the first cell, the mobile station in the second cell accesses the second cell via an uplink channel to update a location registration of the mobile station. The update of the location registration may be referred to as Tracking Area Update (TAU).

More specifically, the mobile station stores and holds the identifier of the location-registered tracking area. The mobile station reselects a cell (cell reselection) while moving. Upon the cell reselection, the mobile station receives broadcast information from the reselected cell and identifies the tracking area identifier included in the received broadcast information. Then, the mobile station determines whether the received new tracking area identifier is different from the tracking area identifier stored and held in the mobile station. When it is determined that the received new tracking area identifier is different from that stored and held in the mobile station, the mobile station determines that the mobile station has moved out from the tracking area where the mobile station was located before and performs the tracking area update (TAU).

However, when it is determined that the received new tracking area identifier is the same as that stored and held in the mobile station, the mobile station determines that the mobile station has not moved out from the tracking area where the mobile station was located before and does not perform the tracking area update (TAU).

As described above, the mobile station performs the reselection process while moving. However, as long as the mobile station determines that the mobile station is located in the same tracking area, the mobile station does not perform the tracking area update (TAU).

Further, the mobile station in the active mode, i.e., the mobile station in communication, does not perform the tracking area update (TAU).

Non Patent Document 1: 3GPP TR 25.813 V1.0.1

DISCLOSURE OF INVENTION

Problems to be Solved by the Invention

In a conventional mobile communication system such as the UMTS (Universal Mobile Telecommunications System), when a mobile station goes into the active mode and performs communication (call) and the call is terminated by terminating the call, the connection between the network and the mobile station is lost. Namely, the mobile station goes into the idle mode from the active mode.

The mobile station that has gone into the idle mode measures the receiving status (quality) of the neighbouring cells, selects a cell having better receiving status, receives the broadcast information from the selected cell, and identifies the tracking area identifer included in the broadcast information. Upon determining that the received tracking area identifier is different from that stored and held in the mobile station, the mobile station performs the tracking area update (TAU).

On the other hand, upon determining that the received new tracking area identifier is the same as the tracking area identifier stored and held in the mobile station, the mobile station does not perform the tracking area update (TAU).

For example, as shown in FIG. 1, the mobile station 2 goes into the active mode from the idle mode in the cell $1_1$ of the tracking area #1 (TA#1), moves from the tracking area #1 (TA#1) to the tracking area #3 (TA#3) through the tracking area #2 (TA#2) by performing handover sequentially from the cell $1_1$ to the cell $1_6$ through the cell $1_2$, cell $1_3$, cell $1_4$, and cell $1_5$, and goes into the idle mode from the active mode in the cell $1_6$ of the tracking area #3 (TA#3) due to the termination of the call (connection) in the cell $1_6$. In FIG. 1, during a moving path of the mobile station between two black circles, the mobile station does not perform the tracking area update (TAU), and at the point of the white circle, the mobile station performs the tracking area update (TAU). In other words, the status of the mobile station on the path between the two black circles is what is before the tracking area update (TAU) is performed, and the status of the mobile station on the white circle is what is after the tracking area update (TAU) is performed.

Namely, once the connection is lost, i.e., after the RRC (Radio Resouce Control) connection is lost, the cell reselection is performed and, when necessary, the tracking area update (TAU) is performed. To that end, it may become necessary to re-establish the RRC connection, and that process may be wasteful.

Unfortunately, due to the above configuration, the mobile station is unable to receive a call in a period from when the connection is lost to when the tracking area update (TAU) process is completed.

Further unfortunately, when the mobile station goes into the idle mode from the active mode, the mobile station identifies the tracking area identifier regardless of whether the mobile station goes into a new tracking area. Therefore, the identification process may become wasteful when the tracking area is unchanged.

The present invention may solve at least one of the problems and an object of the present invention is to provide an access gateway device and a tracking area identifier notification method capable of reducing the wastefulness of the radio resouces that ineffectively identifies the tracking area.

Means for Solving the Problems

According to an aspect of the present invention, there is provided an access gateway device that is used in a mobile communication system in which one or more tracking areas each having one or more cells are provided and that is capable of storing an identifier of a tracking area in which a mobile station in communication is located. The access gateway device includes a table unit storing a table having a corresponding relationships between a tracking area and a base station managing a cell included in the tracking area, a tracking area identifier comparison unit referring to the table at a predetermined timing, detecting the identifier of the tracking area in which the mobile station is located, and comparing the detected identifier of the tracking area with the stored identifier; and a tracking area identifier notification unit notifying the mobile station of the detected identifier of the tracking area when the detected identifier of the tracking area is different from the stored identifier based on a result of the comparison.

By configuring in this way, it may become possible to notify the mobile station in the active mode that the tracking area of the mobile station has been changed.

According to another aspect of the present invention, there is provided a tracking area identifier notification method performed in an access gateway device used in a mobile communication system in which one or more tracking areas each having one or more cells are provided. This tracking area identifier notification method includes a storing step of storing an identifier of the tracking area where a mobile station in communication is located; a tracking area identifier detecting step of referring to a table at a predetermined timing, the table having a corresponding relationships between a tracking area and a base station managing a cell included in the tracking area, and detecting the identifier of the tracking area where the mobile station is located; and a tracking area identifier comparing step of comparing the detected identifier of the tracking area with the stored identifier; and a tracking area identifier notifying step of notifying the mobile station of the detected identifier of the tracking area when the detected identifier of the tracking area is different from the stored identifier based on a result of the comparison.

By performing in this way, it may become possible to notify the mobile station in the active mode that the tracking area has been changed.

Advantageous Effect of the Invention

According to an embodiment of the present invention, there may be provided an access gateway device and a tracking area identifier notification method capable of reducing the wastefulness of the radio resouces that ineffectively identifies the tracking area.

EXPLANATION OF REFERENCES

Figure 1:
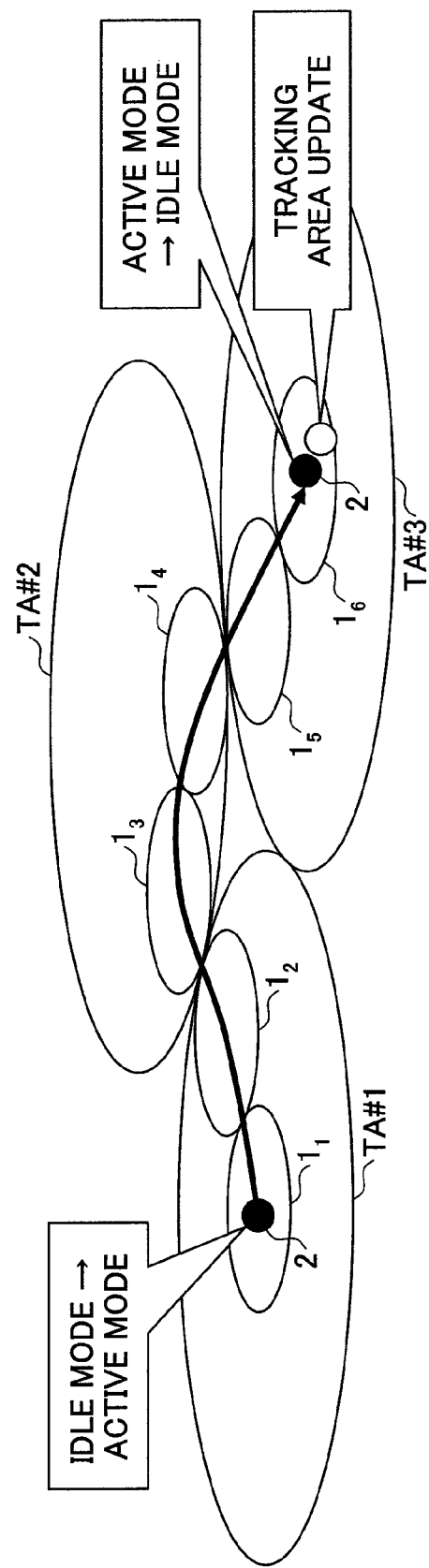
FIG. 1 is a drawing showing a tracking area update (TAU)

100, $100_1$, $100_2$, $100_3$, $100_4$, $100_5$, $100_6$: BASE STATION
1, $1_1$, $1_2$, $1_3$, $1_4$, $1_5$, $1_6$, $102_1$, $102_2$, $102_3$, $102_4$, $102_5$, $102_6$: CELL
2, 200: MOBILE STATION APPARATUS
300, $300_1$, $300_2$, $300_3$, $300_4$, $300_5$, $300_6$: ACCESS GATEWAY DEVICE
302: PATH SWITCH SECTION
304: TRACKING AREA DETERMINATION SECTION
306: TRACKING AREA VS. BASE STATION CORRESPONDING TABLE
308: CONNECTION RELEASE PROCESSING SECTION
310: RELOCATION PROCESSING SECTION
400: HLR
500: CORE NETWORK

BEST MODE FOR CARRYING OUT THE INVENTION

Next, the best mode for carrying out the present invention is described based on the following embodiments with reference to the accompanying drawings.

Throughout the figures describing the embodiments of the present invention, the same reference numerals are used to designate the components having the same function, and repeated descriptions thereof may be omitted.

Figure 2:
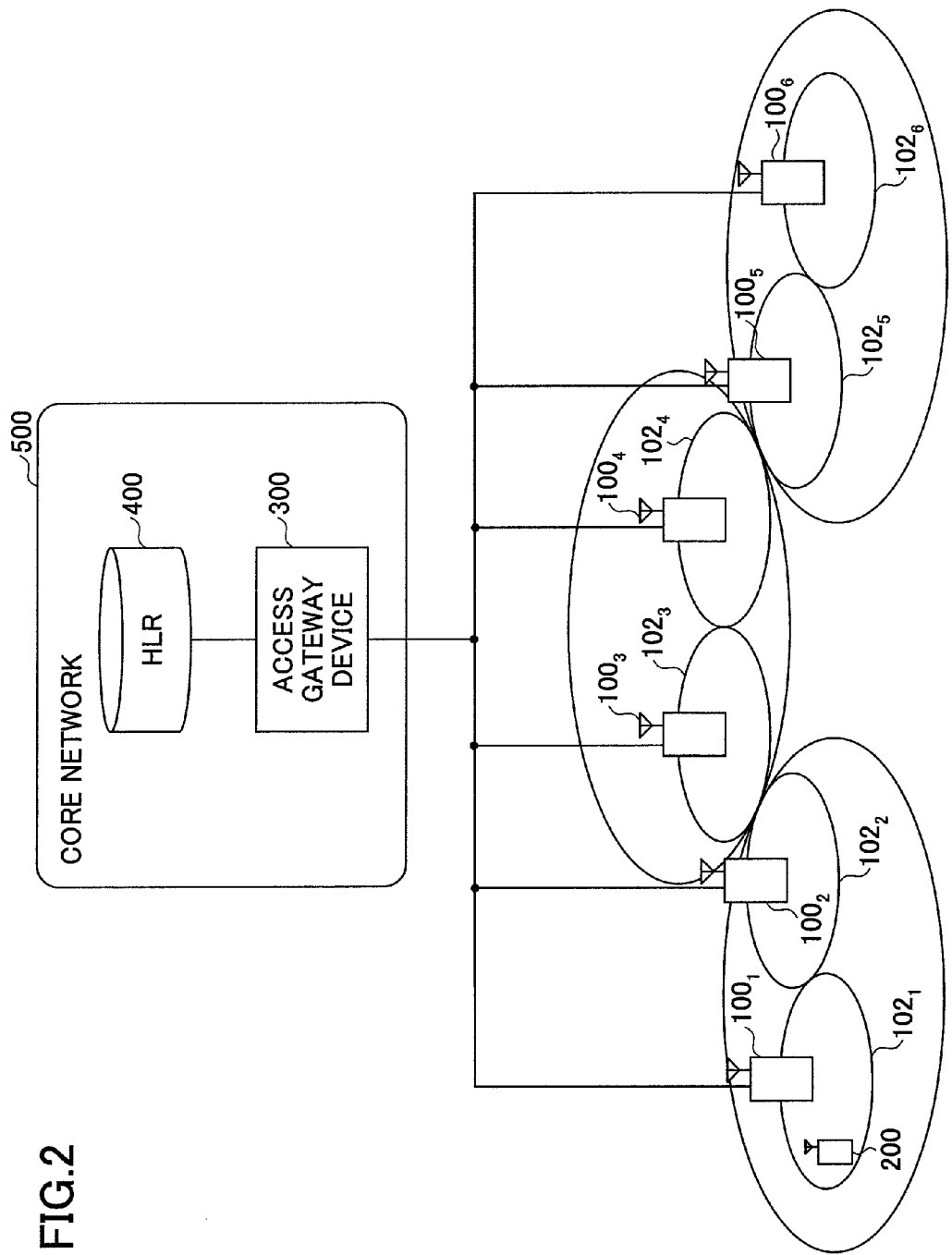
FIG. 2 is a block diagram showing a mobile communication system according to an embodiment of the present invention.

FIG. 2 shows a mobile communication system in which an access gateway device according to an embodiment of the present invention is used.

As shown in FIG. 2, the mobile communication system includes base stations (eNB: eNode B) 100 ($100_1$, $100_2$, $100_3$, $100_4$, $100_5$, $100_6$) and a mobile station (UE: User Equipment) 200. Each of the base stations $100_1$, $100_2$, $100_3$, $100_4$, $100_5$, and $100_6$ manages the corresponding cells called $102_1$, $102_2$, $102_3$, $102_4$, $102_5$, and $102_6$, respectively.

For example, an access gateway device (aGW: access Gateway) 300 is provided in a core network 500. However, the access gateway device 300 may be provided in a network other than the core network 500. Further, the access gateway device 300 may be separated into a control plane (C-plane) and a user plane (U-plane) as the MME/UPE. Further, the core network 500 includes an HLR (Home Location Register) 400.

Next, a mobile communication system according to a first embodiment of the present invention is described.

In the mobile communication system according to the embodiment of the present invention, the tracking area update process is performed whenever the tracking area is changed regardless of whether the mobile station 200 is in the active mode or the idle mode.

The mobile station 200 moves during communication and performs handover when the serving cell is changed. Due to the handover performed by the mobile station 200, the network, namely the access gateway device 300, can identify the cell and the tracking area into which the mobile station 200 moves.

When the serving cell of the mobile station 200 is changed due to the handover performed by the mobile station 200, the access gateway device 300 determines whether the tracking area in which the mobile station 200 is located (serving tracking area) is changed. When it is determined that the serving tracking area is changed, the access gateway device 300 notifies the mobile station 200 of the identifier of the new tracking area into which the mobile station 200 moves. In other words, in this case, the access gateway device 300 allocates the new tracking area identifier.

Figure 3:
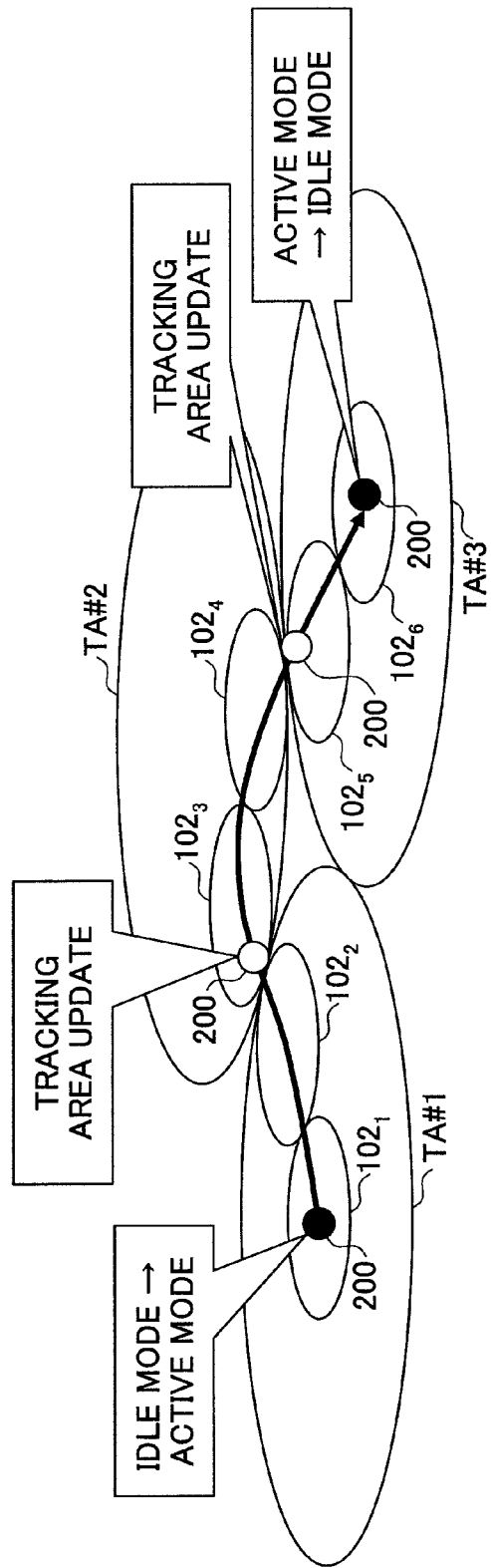
FIG. 3 is a drawing showing the tracking area update (TAU) according to an embodiment of the present invention.

For example, as shown in FIG. 3, the access gateway device 300 does not perform the the tracking area update (TAU) when the mobile station 200 performs handover from the cell $102_1$ to the cell $102_2$ (also from the cell $102_3$ to the cell $102_4$, or from the cell $102_5$ to the cell $102_6$), but does perform the tracking area update (TAU) when the mobile station 200 performs handover from the cell $102_2$ to the cell $102_3$ (also from the cell $102_4$ to the cell $102_5$), because the tracking area is changed between before and after the handover. Upon performing the tracking area update (TAU), the access gateway device 300 notifies the mobile station 200 of the identifier of the tracking area into which the mobile station moves.

By doing in this way, it may no longer be necessary for the mobile station 200 to receive the broadcast information from the serving cell, identify the tracking area identifier included in the broadcast information, and, when necessary, transmit for the tracking area update (TAU) using an uplink channel.

Next, an exemplary partial configuration of the access gateway device 300 according to this embodiment of the present invention is described with reference to FIG. 4.

Figures 4, 5:
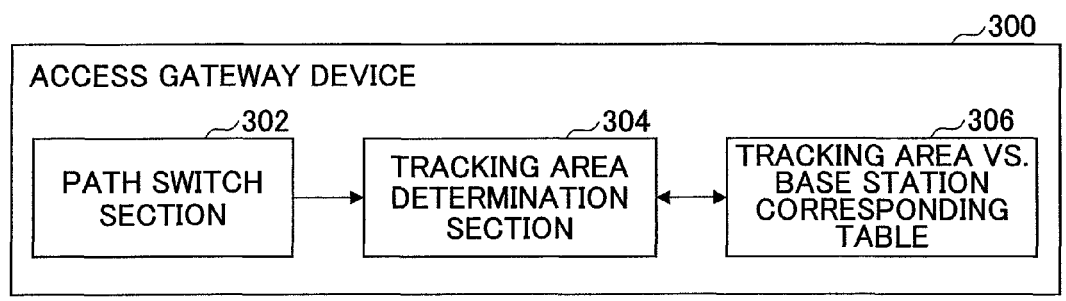
FIG. 4 is a partial block diagram showing an access gateway device according to an embodiment of the present invention.
FIG. 5 is a table showing corresponding relationships between the tracking areas and base stations.

As shown in FIG. 4, the access gateway device 300 includes a path switch section 302, a tracking area determination section 304 serving as tracking area identifier comparison means and tracking area identifier notification means, and a tracking area vs. base station corresponding table 306 as a table means.

The path switch section 302 switches (changes) the path for the mobile station from a handover source base station to a handover destination base station based on a Path switch request transmitted from the handover destination base station, in which the mobile station performs handover from the handover source base station to the handover destination base station. Herein, the Path switch request refers to a request for changing a routing path and is transmitted as a signal from the handover destination base station to the access gateway device 300 so that the UPE can transmit data packets directly to the handover destination base station.

FIG. 5 shows an example of the tracking area vs. base station corresponding table 306 showing corresponding relationships between each identifier of the corresponding tracking areas and the identifiers of the base stations that manage the cells that belong to the tracking areas.

The tracking area determination section 304 stores the identifier indicating the tracking area where the mobile station is located. When the mobile station performs handover, resulting in that the base station managing the serving cell is changed, the tracking area determination section 304 refers to the tracking area vs. base station corresponding table 306, obtains the identifier of the tracking area to which the handover destination base station belongs, and determines whether the obtained identifier is the same as the stored tracking area identifier.

When it is determined that the obtained identifier is the same as the stored tracking area identifier, the tracking area determination section 304 determines that the mobile station 200 has not moved into a new tracking area (i.e., the tracking area is unchanged). In this case, no tracking area identifier is notified.

On the other hand, when it is determined that the obtained identifier is different from the stored tracking area identifier, the tracking area determination section 304 determines that the mobile station 200 has moved into a new tracking area (i.e., the tracking area is changed), notifies the mobile station 200 of the identifier of the tracking area to which the handover destination base station belongs, and stores the identifier. By doing in this way, it may become possible to always store and hold the latest tracking area identifier.

Figure 6:
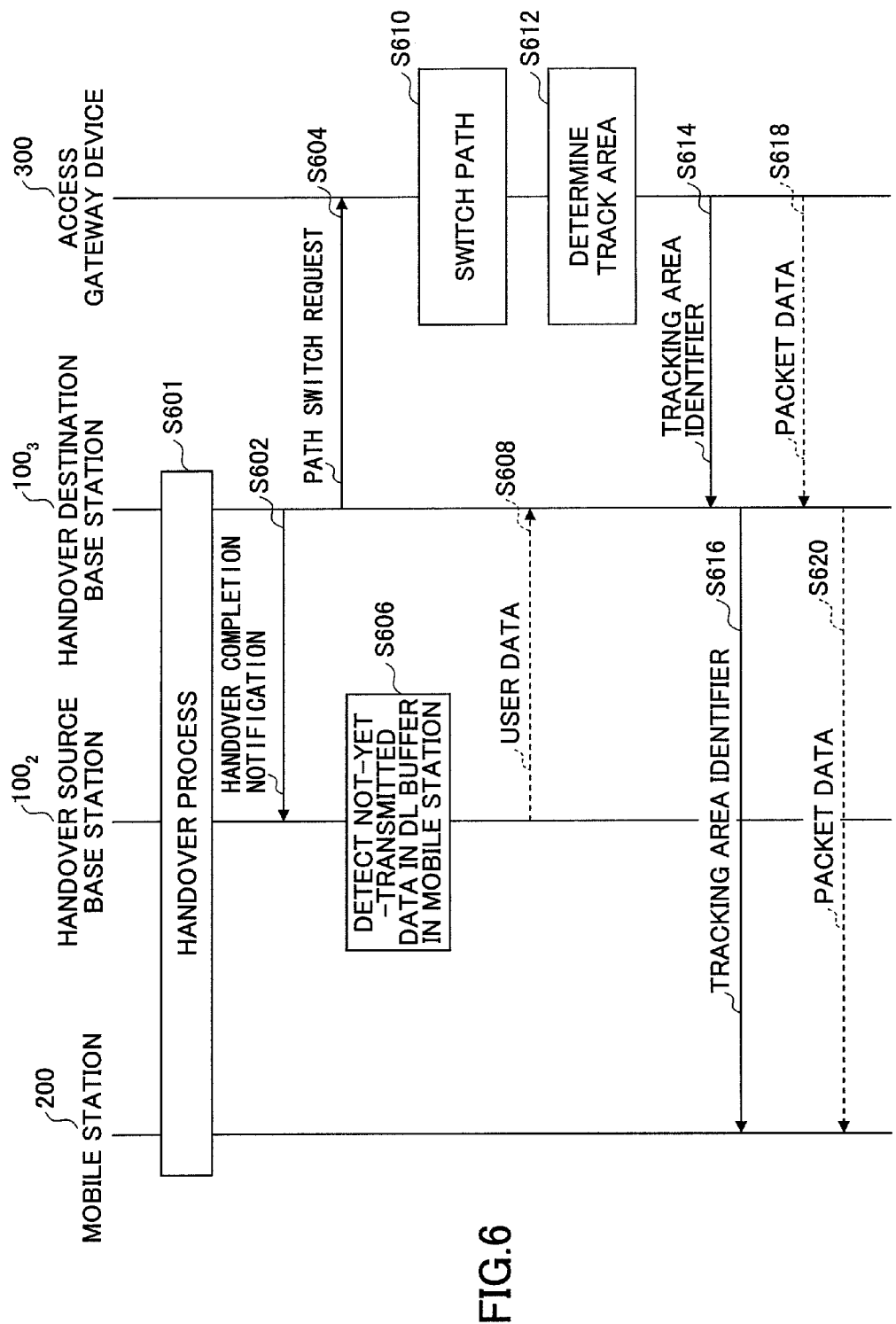
FIG. 6 is a sequential diagram showing a process of the mobile communication system according to an embodiment of the present invention.

Next, exemplary operations of a mobile communication system according to this embodiment of the present invention are described with reference to FIG. 6.

Herein, a case is described with reference to FIG. 6 where the mobile station 200 performs handover by moving from the cell $102_2$ into the cell $102_3$, the cell $102_2$ being managed by the base station $100_2$ and the cell $102_3$ being managed by the base station $100_3$. In this case, due to this handover, the tracking area is also changed. In the following, the base stations $100_2$ may be referred to as a handover source base station $100_2$, and the base station $100_3$ may be referred to as a handover destination base station $100_3$.

First, the mobile station 200 performs handover by moving from the cell managed by the handover source base station $100_2$ into the cell managed by the handover destination base station $100_3$. Namely, due to the handover, each of the mobile station 200, the handover source base station $100_2$, and the handover destination base station $100_3$ performs a handover process (in step S601) (see, for example, Non Patent Document 1).

The handover destination base station $100_3$ notifies the handover source base station $100_2$ that the handover process is completed (in step S602) and sends the Path switch request to the access gateway device 300 (in step S604).

The handover source base station $100_2$ detects data sets from a downlink buffer, the data sets not yet been transmitted to the mobile station 200 (in step S606) and transmits the detected data sets to the handover destination base station $100_3$ (in step S608).

On the other hand, the path switch section 302 switches (changes) the path for the mobile station 200 from a handover source base station $100_2$ to a handover destination base station $100_3$ based on the Path switch request transmitted from the handover destination base station $100_3$ (in step S610).

Next, the tracking area determination section 304 refers to the tracking area vs. base station corresponding table 306, obtains the identifier of the tracking area to which the handover destination base station $100_3$ belongs, and determines whether the obtained identifier is the same as the stored tracking area identifier.

When it is determined that the obtained identifier of the tracking area to which the handover destination base station $100_3$ belongs is the same as the stored tracking area identifier, the tracking area determination section 304 determines that the mobile station 200 has not moved into a new tracking area (i.e., the tracking area is unchanged). On the other hand, when it is determined that the obtained identifier of the tracking area to which the handover destination base station $100_3$ belongs is different from the stored tracking area identifier, the tracking area determination section 304 determines that the mobile station 200 has moved into a new tracking area (i.e., the tracking area is changed).

In this case, the tracking area determination section 304 determines that the obtained identifier of the tracking area to which the handover destination base station $100_3$ belongs is different from the stored tracking area identifier, i.e., the identifier of the tracking area to which the handover source base station $100_2$ belongs (in step S612).

Next, the tracking area determination section 304 notifies the mobile station 200 of the identifier of the tracking area to which the handover destination base station $100_3$ belongs through the handover destination base station $100_3$ using a dedicated channel (DCH) or the like (steps S614 and S616). Further, the tracking area determination section 304 updates the identifier of the tracking area with respect to the mobile station 200.

After the above processes, the access gateway device 300 transmits packet data to the mobile station 200 through the handover destination base station $100_3$ (steps S618 and S620).

In the above description, a case is described where the tracking area is changed upon the handover. However, when the tracking area is not changed upon the handover, the above steps S614 and S616 may not be performed.

As described above, when the mobile station 200 is in the active mode, the network 500, or more specifically, for example, the access gateway device 300, determines whether the tracking area with respect to the mobile station 200 is changed. Only when it is determined that the tracking area is changed, the identifier of the tracking area into which the mobile station 200 moves is notified to the mobile station 200 via a dedicated channel (DCH). By configuring in this way, advantageously, it may become possible to reduce wasteful use of the radio resource for identifying the tracking area.

Further advantageously, the access gateway device 300 is configured to store and hold the identifier of the latest tracking area. Therefore, it may become possible for the mobile station 200 to immediately receive a call even after the RRC connection is lost.

The access gateway device 300 according to this embodiment of the present invention detects the tracking area upon each handover. Therefore, the access gateway device 300 according to this embodiment of the present invention may be preferably used for a user who is likely to use the mobile station in relatively short time (short conversation) at a time and moves slowly so that the number of handover is relatively small.

Next, a mobile communication system according to a second embodiment of the present invention is described with reference to FIG. 7 through 9.

When the mobile station 200 is in communication, the network side may determine the serving cell of the mobile station 200. Therefore, while the mobile station 200 is in communication, it is not necessary to update the location registration (i.e., tracking area update). On the other hand, the information of the tracking area is necessary for the mobile station 200 to receive a call after the mobile station 200 goes into the idle mode.

By considering the above facts, in a mobile communication system according to this embodiment of the present invention, before a call termination process is completed to release the connection between the mobile station 200 and the network 500, if it is determined that the current tracking area is different from the tracking area where the mobile station 200 is located when the connection between the network, or, for example, the access gateway device 300 and the mobile station 200 is established, the identifier of the updated (current) tracking area is notified to the mobile station 200.

A configuration of the mobile communication system according to this embodiment of the present invention is similar to that described with reference to FIG. 2.

Figure 7:
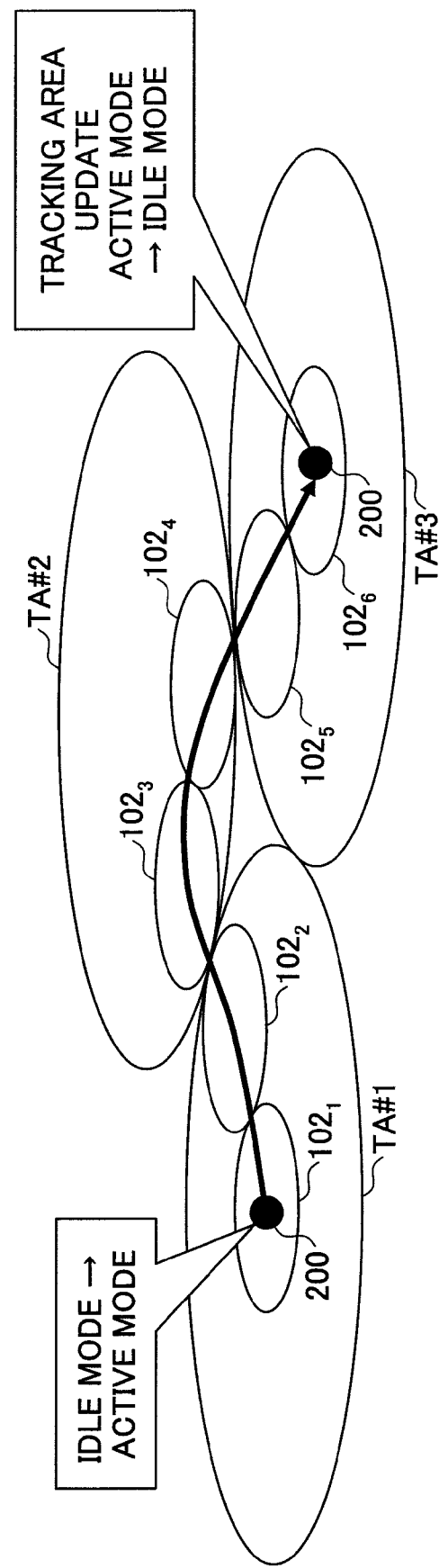
FIG. 7 is a drawing showing the tracking area update (TAU) according to an embodiment of the present invention.

As shown in FIG. 7, when the mobile station 200 starts communication in the cell $102_1$ which belongs to the tracking area #1 (TA#1) and performs handover from the cell $102_1$ to the cell $102_6$ proceeding sequentially through the cell $102_2$, the cell $102_3$, the cell $102_4$, and the cell $102_5$, before the connection between the access gateway 300 and the mobile terminal 200 is terminated, the access gateway 300 obtains the identifier of the tracking area where the mobile station 200 is located, compares the obtained identifier with the identifier of the tracking area when the mobile station 200 goes in the active mode, i.e., the mobile station 200 starts the communication, and when it is determined that those identifiers are different from each other, notifies the mobile station 200 of the identifier of the tracking area where the mobile station 200 is located and then terminates the connection with the mobile station 200. In this case of FIG. 7, the mobile station 200 starts communication (call) in the cell $102_1$ which belongs to the tracking area #1 and terminates the call in the cell $102_6$ which belongs to the tracking area #3. Therefore, the cell $102_6$ does notify the mobile station 200 of the identifier of the tracking area where the mobile station 200 is located, i.e., allocates the tracking area identifier.

By doing in this way, it may no longer be necessary for the mobile station 200 to receive the broadcast information from the serving cell, identify the tracking area identifier included in the broadcast information, and, when necessary, transmit for the tracking area update (TAU) via an uplink channel.

Further, compared to the first embodiment, it may become possible to reduce the number of performing the tracking area update (TAU) process.

Next, an exemplary partial configuration of the access gateway device 300 according to this embodiment of the present invention is described with reference to FIG. 8.

Figure 8:
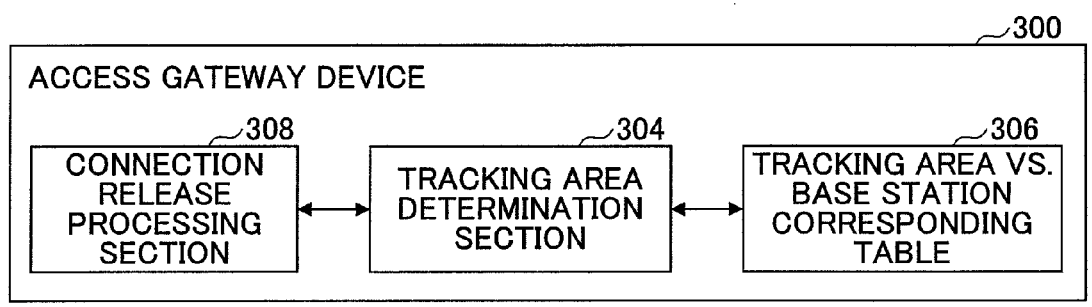
FIG. 8 is a partial block diagram showing an access gateway device according to an embodiment of the present invention.
Figure 9:
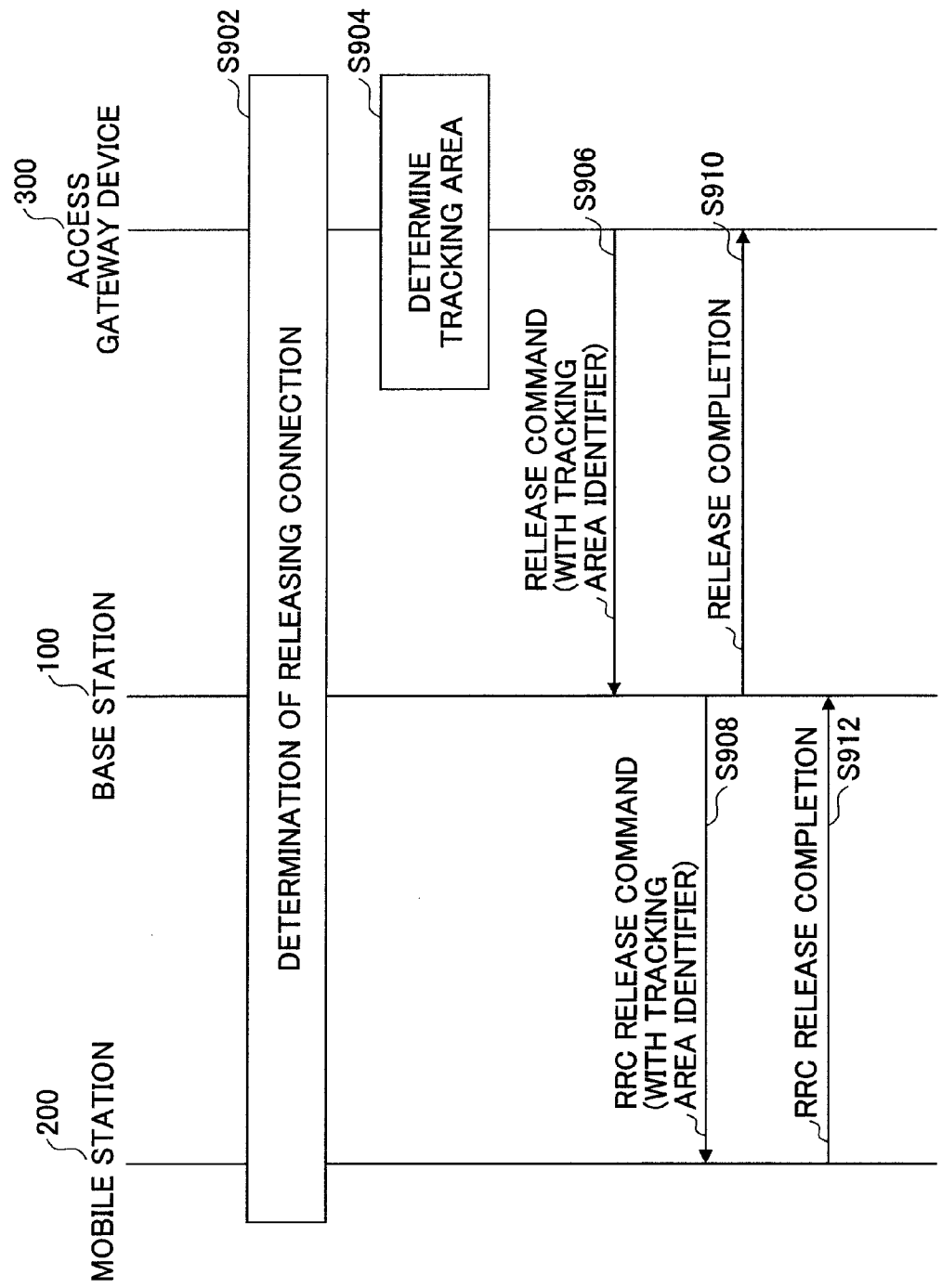
FIG. 9 is a sequential diagram showing a process of the mobile communication system according to an embodiment of the present invention.

As shown in FIG. 8, the access gateway device 300 includes a connection release processing section 308, the tracking area determination section 304, and the tracking area vs. base station corresponding table 306.

The connection release processing section 308, when at least one of the mobile station 200, the base station 100, and the access gateway 300 determines to release the connection, notifies the tracking area determination section 304 that the release of the connection is determined.

For example, the mobile station 200 determines to release the connection when a call release command is issued. The base station 100 determines to release the connection when poor radio channel conditions continue for a predetermined time period to time out. The access gateway device 300 determines to release the connection when no data is received even a predetermined time period elapses.

The tracking area vs. base station corresponding table 306, as described with reference to FIG. 5, shows corresponding relationships between each identifier of the corresponding tracking areas and the identifiers of the base stations that manage the cells that belong to the tracking areas.

The tracking area determination section 304 stores the identifier indicating the tracking area when the mobile station 200 goes into the active mode from the idle mode, i.e., when the mobile station 200 starts communication. When it is determined to release the connection among the mobile station 200, the base station 100, and the access gateway device 300, based on the notification from the connection release processing section 308, the tracking area determination section 304 obtains the identifier of the base station managing the serving cell where the mobile station is located, refers to the tracking area vs. base station corresponding table 306, obtains the identifier of the tracking area based on the obtained identifier of the base station, and determines whether the obtained identifier is the same as the stored tracking area identifier.

When it is determined that the obtained identifier is the same as the stored tracking area identifier, the tracking area determination section 304 determines that the mobile station 200 has not moved into a new tracking area (i.e., the tracking area is unchanged). In this case, the tracking area determination section 304 notifies the connection release processing section 308 that the determination process of the tracking area is completed without notifying any tracking area identifier.

On the other hand, when it is determined that the obtained identifier is different from the stored tracking area identifier, the tracking area determination section 304 determines that the mobile station 200 has moved into a new tracking area (i.e., the tracking area is changed), notifies the mobile station of the obtained identifier of the tracking area, and notifies the connection release processing section 308 that the determination process of the tracking area is completed.

Upon being notified that the determination process of the tracking area is completed from the tracking area determination section 304, the connection release processing section 308 releases the connection.

Next, exemplary operations of a mobile communication system according to this embodiment of the present invention are described with reference to FIG. 9.

The connection release processing section 308, when at least one of the mobile station 200, the base station 100, and the access gateway 300 determines to release the connection, notifies the tracking area determination section 304 that the release of the connection is determined (in step S902).

Based on the notification from the connection release processing section 308, the tracking area determination section 304 obtains the identifier of the base station 100 managing the serving cell where the mobile station 200 is located, refers to the tracking area vs. base station corresponding table 306, obtains the identifier of the tracking area based on the obtained identifier of the base station, and determines whether the obtained identifier is the same as the stored tracking area identifier when the mobile station 200 goes into the active mode from the idle mode (in step S904).

When it is determined that the identifier of the tracking area where the mobile station 200 is located is different from the stored tracking area identifier, the tracking area determination section 304 determines that the mobile station 200 has moved into a new tracking area (i.e., the tracking area is changed).

In this case, the connection release processing section 308 notifies the base station 100 of a release command including the obtained tracking area identifier (in step S906).

Next, the base station 100 notifies the mobile station 200 of an RRC release command including the obtained tracking area identifier (in step S908) and notifies the access gateway device 300 of the completion of the release (in step S910).

Next, the mobile station 200 notifies the completion of the RRC release (in step S912).

When it is determined that the identifier of the tracking area where the mobile station 200 is located is the same as the stored tracking area identifier, the tracking area determination section 304 determines that the mobile station 200 has not moved into a new tracking area (i.e., the tracking area is unchanged).

When this is the case, in step S906, the connection release processing section 308 notifies the base station 100 of a release command not including the identifier of the tracking area where the mobile station 200 is located. Next, in step S908, the base station 100 notifies the mobile station 200 of the RRC release command not including the identifier of the tracking area where the mobile station 200 is located.

Next, a mobile communication system according to a third embodiment of the present invention is described with reference to FIG. 10 through 13.

When the mobile station 200 moved from one tracking area (source tracking area) to another (destination tracking area), there may be a case where the access gateway device managing the source tracking area is different from the access gateway device managing the destination tracking area.

Figure 10:
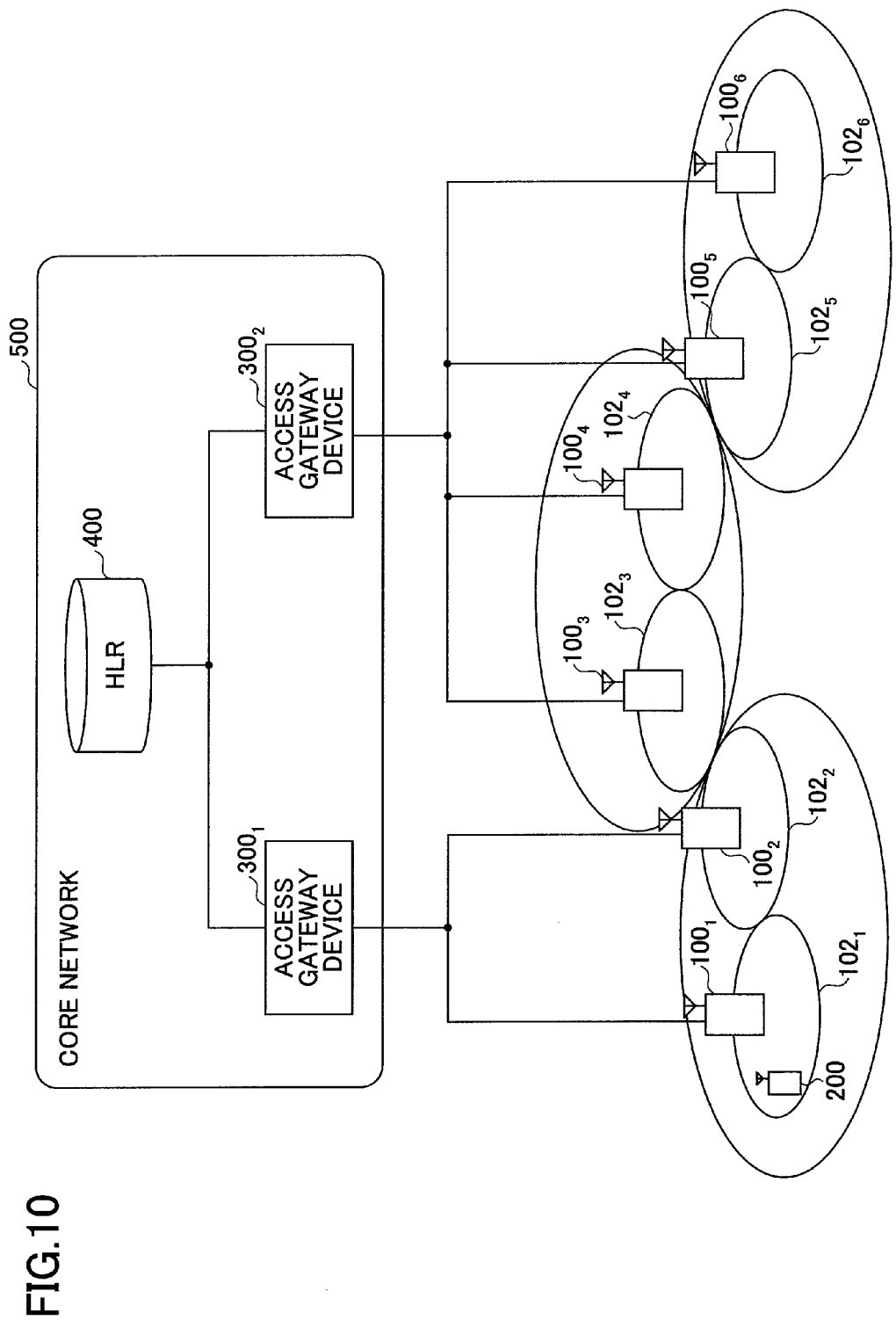
FIG. 10 is a block diagram showing a mobile communication system according to an embodiment of the present invention.

For example, as shown in FIG. 10, when the mobile station 200 moves from the cell $102_2$ managed by the base station $100_2$ into the cell $102_3$ managed by the base station $100_3$, a switching is performed from the access gateway device $300_1$ to the access gateway device $300_2$. This switching between the access gateway devices is called relocation. Further, in this case, such an access gateway device $300_1$ may be referred to as a relocation source access gateway device and such an access gateway device $300_2$ may be referred to as a relocation destination access gateway device.

However, this relocation is not always performed when the mobile station 200 moves from one tracking area to another. This is because there may be a case, for example, where a base station may be managed by plural access gateway devices for load distribution purposes as shown in FIG. 11.

Figure 11:
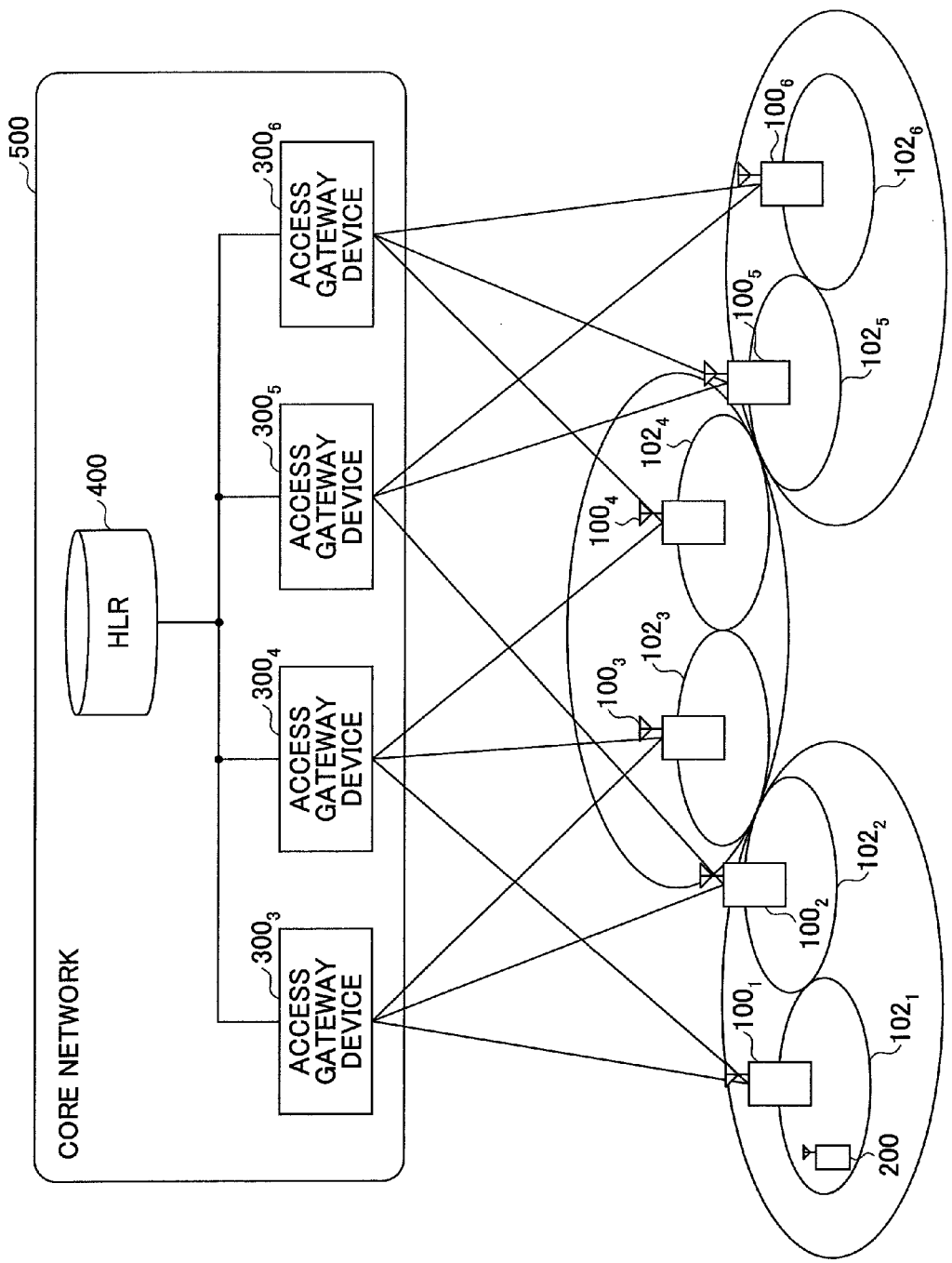
FIG. 11 is a block diagram showing a mobile communication system according to an embodiment of the present invention.

FIG. 11 shows a case where each base station may be managed by plural access gateway devices, and more specifically, the base station $100_1$ may be managed by the access gateway devices $300_3$ or $300_4$.

When configured as described above, for example, the access gateway device managing the mobile station may be switched (changed) from the access gateway device $300_3$ to the access gateway devices $300_4$.

Those plural access gateway devices managing base stations for load distribution purposes in this way may be called an MME/UPE pool.

In a mobile communication system according to this embodiment of the present invention, the identification of the tracking area is triggered by switching (changing) the access gateway device from one to another.

Next, an exemplary partial configuration of the access gateway device 300 according to this embodiment of the present invention is described with reference to FIG. 12.

Figure 12:
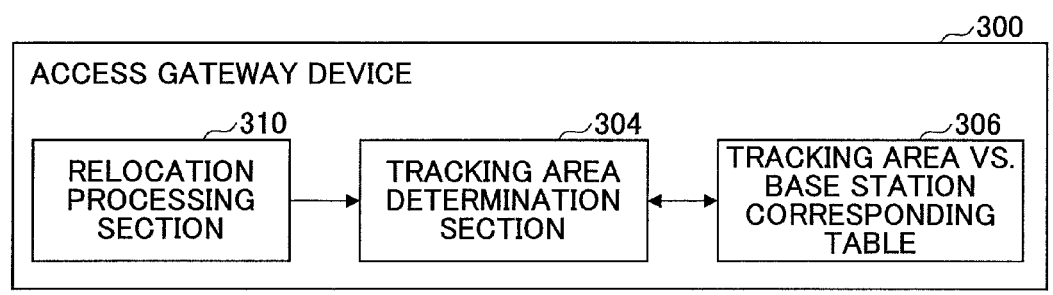
FIG. 12 is a partial block diagram showing an access gateway device according to an embodiment of the present invention.

As shown in FIG. 12, the access gateway device 300 includes a relocation processing section 310, the tracking area determination section 304, and the tracking area vs. base station corresponding table 306.

Based on the load distribution status among the access gateway devices, the relocation processing section 310 of an access gateway device determines whether the access gateway device managing the mobile station 200 is to be changed from the currently managing other access gateway device to the access gateway device. Upon determining that the access gateway device managing the mobile station 200 is to be changed from the currently managing other access gateway device to the access gateway device, the relocation processing section 310 sends a relocation request to the HLR (Home Location Register) 400 to change the access gateway device managing the mobile station 200 so that the access gateway device manages the mobile station 200. Based on the relocation request from the access gateway device, the HLR 400 issues a relocation command to the currently managing other access gateway device to change the access gateway device that manages the mobile station 200.

Further, upon receiving the relocation command from the HLR 400, the currently managing other access gateway device performs a predetermined process and sends back a relocation response to the HLR 400. Upon receiving the relocation response from the currently managing other access gateway device, the HLR switches (changes) the access gateway device managing the mobile station 200 from the currently managing other access gateway device to the access gateway device that sends the relocation request and notifies the access gateway device that sends the relocation request of the completion of the relocation.

The tracking area vs. base station corresponding table 306, as described with reference to FIG. 5, shows corresponding relationships between each identifier of the corresponding tracking areas and the identifiers of the base stations that manage the cells that belong to the tracking areas.

When the relocation is performed and the access gateway device managing the mobile station 200 is switched to the access gateway device having sent the relocation request, the tracking area determination section 304 of the access gateway device having sent the relocation request obtains the identifier of the base station where the mobile station 200 is located, refers to the tracking area vs. base station corresponding table 306, obtains the identifier of the tracking area based on the obtained identifier of the base station where the mobile station 200 is located, and determines whether the obtained identifier is the same as a notified identifier of the tracking area. In this case, for example, the notified identifier of the tracking area refers to the identifier of the tracking area stored in the access gateway device that managed the mobile station 200 before the relocation is performed, the relocation being performed to change the access gateway device that manages the mobile station from the access gateway device that managed the mobile station before the relocation is performed (i.e., the relocation source access gateway device) to the access gateway device that sent the relocation request for the relocation (i.e., the relocation destination access gateway device). Further, upon the relation, the identifier of the tracking area stored in the relocation source access gateway device is notified to the relocation destination access gateway device.

When it is determined that the identifier of the tracking area where the mobile station 200 is located is the same as the notified identifier of the tracking area, the tracking area determination section 304 determines that the mobile station 200 has not moved into a new tracking area (i.e., the tracking area is unchanged). In this case, no tracking area is notified.

On the other hand, when it is determined that the identifier of the tracking area where the mobile station 200 is located is different from the notified identifier of the tracking area, the tracking area determination section 304 determines that the mobile station 200 has moved into a new tracking area (i.e., the tracking area is changed), notifies the mobile station of the identifier of the tracking area where the mobile station 200 is located.

Figure 13:
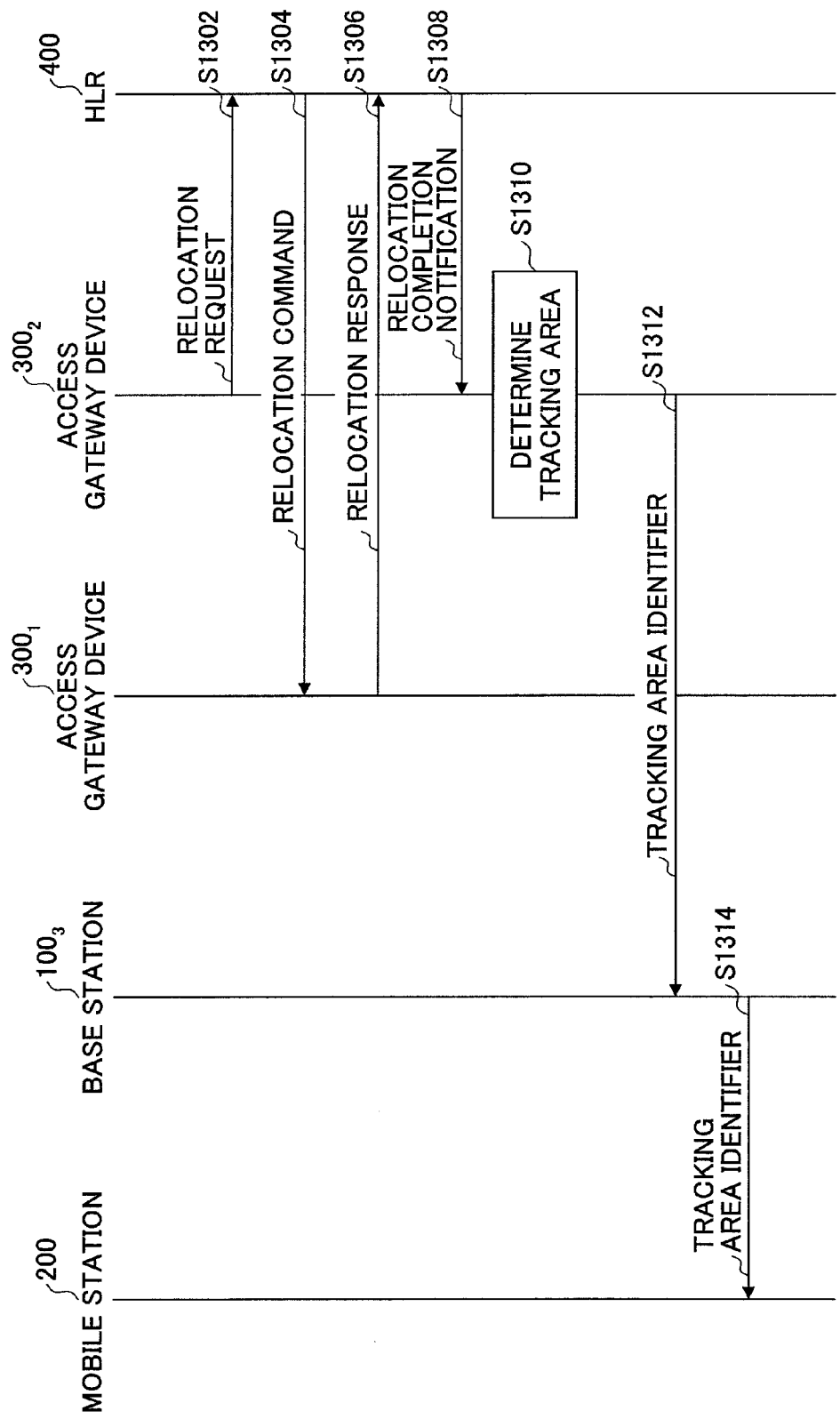
FIG. 13 is a sequential diagram showing a process of the mobile communication system according to an embodiment of the present invention.

Next, exemplary operations of a mobile communication system according to this embodiment of the present invention are described with reference to FIG. 13. In a system configuration shown in FIG. 10 according to this embodiment of the present invention, a case is described where the mobile station 200 performs handover by moving from the cell $102_2$ into the cell $102_3$. As a result of this handover in this case, the tracking area managing the mobile station 200 is changed and the access gateway device managing the base station managing the mobile station 200 is also switched (changed).

In this case, the mobile station 200 performs handover by moving from the cell $102_2$ into the cell $102_3$, the cell $102_2$ being managed by the handover source base station $100_2$ and the cell $102_3$ being managed by the handover destination base station $100_3$.

The relocation processing section 310 of the access gateway device $300_2$ sends a relocation request to the HLR 400 (in step S1302).

Next, the HLR 400 sends the relocation command to the relocation source access gateway device $300_1$ (in step S1304).

Next, the relocation processing section 310 of the access gateway device $300_1$ performs a relocation process and sends a relocation response notification to the HLR 400 (in step S1306).

Next, the HLR 400 sends a relocation completion notification to the access gateway device $300_2$ (in step S1308). This relocation completion notification includes the identifier of the tracking area with respect to the mobile station 200 stored in the HLR 400. Further, the relocation response notification may includes the identifier of the tracking area with respect to the mobile station 200 stored in the access gateway device $300_1$. By doing in this way, the relocation completion notification becomes to include the identifier of the tracking area with respect to the mobile station 200 stored in the access gateway device $300_1$. The tracking area determination section 304 of the access gateway device $300_2$ stores the notified identifier of the tracking area with respect to the mobile station 200.

Next, the tracking area determination section 304 of the access gateway device $300_2$ refers to the tracking area vs. base station corresponding table 306, obtains the identifier of the tracking area to which the base station 100 belongs, and determines whether the obtained identifier is the same as the stored tracking area identifier (in step S1310).

When it is determined that the identifier of the tracking area to which the base station belongs is the same as the stored tracking area identifier, the tracking area determination section 304 determines that the mobile station 200 has not moved into a new tracking area (i.e., the tracking area is unchanged). In this case, no identifier of the tracking area is notified.

On the other hand, when it is determined that the identifier of the tracking area to which the base station belongs is different from the stored tracking area identifier, the tracking area determination section 304 determines that the mobile station 200 has moved into a new tracking area (i.e., the tracking area is changed).

In this case, it is determined that the identifier of the tracking area to which the base station belongs is different from the stored tracking area identifier.

Next, the tracking area determination section 304 notifies the mobile station 200 of the identifier of the tracking area to which the base station 100 belongs through the base station 100₃ using a dedicated channel (DCH) (steps S1312 and S1314).

In the above description, the present invention is described by being divided into several embodiments. However, it should be noted that the division of the present invention into several embodiments is not an essential element of the present invention. For example, two or more embodiments may be combined on as as-needed basis. To promote an understanding of the present invention, specific values are used as examples throughout the description. However, it should be noted that such specific values are just sample values unless otherwise described, and any other values may be used.

The present invention is described by referring to a specific embodiment. However, a person skilled in the art may understand that the above embodiment is described for illustrative purpose only and may think of examples of various modifications, transformations, alterations, changes, and the like. For illustrative purposes, the apparatus according to an embodiment of the present invention is described with reference to the functional block diagrams. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present international application claims priority from Japanese Patent Application No. 2006-297051 filed on Oct. 31, 2006, the entire contents of which are hereby incorporated herein by reference.

The invention claimed is:

1. An access gateway device comprising:
    a storage unit configured to store an identifier of a tracking area where a mobile station is located;
    a table unit configured to store a table having a corresponding relationships between the tracking area and a base station managing a cell included in the tracking area;
    an acquisition unit configured to, when the mobile station in an active mode performs handover to a handover destination, acquire the identifier of the tracking area corresponding to the base station of the handover destination based on the table;
    a tracking area identifier comparison unit configured to compare the identifier of the tracking area where the mobile station in the active mode is located, the identifier of the tracking area being stored in the storage unit, with the identifier of the tracking area corresponding to the base station of the handover destination, the identifier of the tracking area being acquired by the acquisition unit; and
    a tracking area identifier notification unit configured to notify the mobile station in the active mode of the identifier of the tracking area corresponding to the base station of the handover destination when the identifier of the tracking area where the mobile station in the active mode is located, the identifier of the tracking area being stored in the storage unit is different from the identifier of the tracking area corresponding to the base station of the handover destination, the identifier of the tracking area being acquired by the acquisition unit, based on a comparison result by the tracking area identifier comparison unit.

2. The access gateway device according to claim 1, wherein the tracking area identifier comparison unit is configured to compare the identifier of the tracking area where the mobile station in the active mode is located, the identifier of the tracking area being stored in the storage unit, with the identifier of the tracking area corresponding to the base station of the handover destination, the identifier of the tracking area being acquired by the acquisition unit, when the base station of the handover destination sends a request to switch a routing path for the mobile station in the active mode.

3. The access gateway device according to claim 2, further comprising:
    an updating unit configured to update the identifier of the tracking area stored in the storage unit based on the identifier of the tracking area of the moving station in the active mode notified by the tracking area identifier.

4. The access gateway device according to claim 1, wherein the storage unit is configured to store the identifier of the tracking area where the moving station in the active mode is located when a mode of the moving station is transited from an idle mode to the active mode, the acquisition unit is configured to, when a connection with the moving station in the active mode is to be released, acquire the identifier of the tracking area where the moving station in the active mode is located from the table before the connection to the moving station in the active mode is released, and
    the tracking area identifier comparison unit is configured to compare the identifier of the tracking area acquired by the acquisition unit with the identifier of the tracking area where the moving station in the active mode is located, the identifier of the tracking area being stored in the storage unit.

5. The access gateway device according to claim 4, wherein when the comparison result by the tracking area identifier comparison unit indicates that the identifier of the tracking area where the moving station in the active mode is located, the identifier of the tracking area being acquired by the acquisition unit, is different from the identifier of the tracking area where the moving station in the active mode is located, the identifier of the tracking area being stored in the storage unit, the tracking area identifier notification unit is configured to notify the moving station in the active mode of a release command including the identifier of the tracking area acquired by the acquisition unit.

6. The access gateway device according to claim 1, wherein when each mobile station is managed by at least one access gateway device,
    a determination is made that managing a first mobile station is switched from another access gateway device to the access gateway device,
    the identifier of the tracking area where the first mobile station is located is notified to the access gateway device, and
    based on a relocation completion notification is sent from a home location register, the acquisition unit is configured to acquire the identifier of the tracking area where the first moving station is located from the table, and
    the tracking area identifier comparison unit is configured to compare the identifier of the tracking area acquired by the acquisition unit and the identifier of the tracking area notified from the other access gateway device.

7. A tracking area identifier notification method performed in an access gateway device used in a mobile communication system in which one or more tracking areas each having one or more cells are provided, the method comprising:

a storage step of storing an identifier of a tracking area where a mobile station is located:

a tracking area identifier acquisition step of, when the mobile station in an active mode performs handover to a handover destination acquiring the identifier of the tracking area corresponding to the base station of the handover destination based on a table having a corresponding relationship between the tracking area and a base station managing a cell included in the tracking area;

a tracking area identifier comparing step of comparing the identifier of the tracking area where the mobile station in the active mode is located, the identifier of the tracking area being stored in the storage unit, with the identifier of the tracking area corresponding to the base station of the handover destination, the identifier of the tracking area being acquired by the acquisition unit; and a tracking area identifier notifying step of notifying the mobile station in the active mode of the identifier of the tracking area corresponding to the base station of the handover destination when determining that the identifier of the tracking area where the mobile station in the active mode is located, the identifier of the tracking area being stored in the storage step is different from the identifier of the tracking area corresponding to the base station of the handover destination, the identifier of the tacking area being acquired in the tracking area identifier acquisition step, based on the comparison result by the tracking area identifier comparison unit.

* * * * *